(No Model.)

J. B. ALTMAN.
HAME TUG.

No. 374,648. Patented Dec. 13, 1887.

Witnesses
R. C. Laurie
Van Buren Hillyard

Inventor
John B. Altman
By R. S. & A. P. Lacey
Attys

UNITED STATES PATENT OFFICE.

JOHN B. ALTMAN, OF CASCADE, IOWA.

HAME-TUG.

SPECIFICATION forming part of Letters Patent No. 374,648, dated December 13, 1887.

Application filed September 15, 1887. Serial No. 249,774. (No model.)

*To all whom it may concern:*

Be it known that I, JOHN B. ALTMAN, a citizen of the United States, residing at Cascade, in the county of Dubuque and State of Iowa, have invented certain new and useful Improvements in Hame-Tug Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to hame-tug fasteners, and has for its object the production of a simple means for connecting the tug with the hames, whereby the tug can be readily lengthened or shortened.

The improvement consists in the novel features of construction and arrangement of parts hereinafter more fully set forth, claimed, and shown in the annexed drawings, in which—

Figure 1:
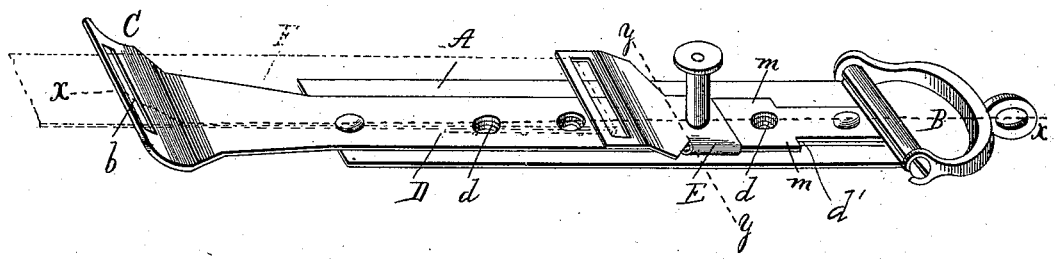
Figure 2:
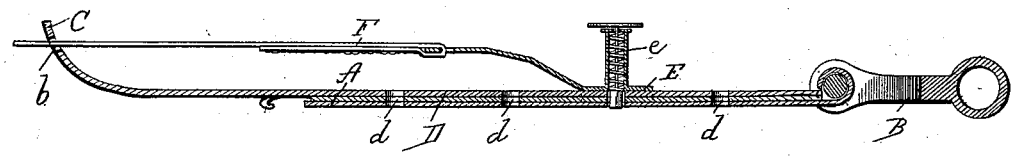
Figure 3:
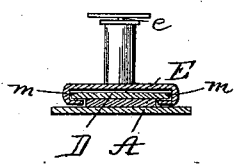

Figure 1 is a perspective view of the fastener embodying my invention; Fig. 2, a longitudinal section on the line X X of Fig. 1, showing the tug in position; Fig. 3, a cross-section on the line Y Y of Fig. 1.

The hame-iron A, having the loop B at one end and having its opposite end, C, curved outwardly and provided with the slot b, has a raised guideway, D, with undercut edges to form the projecting ledges m, upon which the tug-carrier E is mounted, and is held by having its edges bent about and embracing the projecting ledges m of the guideway. The openings d in the guideway are adapted to be engaged by the spring latch-bolt e and hold the tug-carrier at any adjusted position. The outer end, C, of the tug-carrier is curved outward and slotted to receive the end of the tug, which is passed through the slot and secured therein in any desired manner. The ledges m of the guideway have a portion removed near their inner ends at d' a sufficient distance to permit the ready attachment and detachment of the tug-carrier.

The guideway may form an integral part of the hame-iron; or it may be separate and attached thereto, if preferred. However, in practice it will be made both ways. The tug F passes through the slot b in the hame-iron and is fastened to the tug-carrier E, which is adjustable along on the guideway for lengthening and shortening the tug. The tug-carrier is held in the adjusted position by the spring latch-bolt e, which engages with one of the openings d in the guideways.

Having thus described my invention, what I claim, and desire to secure by Letters Patent, is—

1. The combination, with the hame-iron having a guideway provided with projecting ledges and having a series of openings, of the carrier having its edges bent to embrace the said ledges, and the springing latch adapted to engage with any of the said openings, substantially as described.

2. The herein shown and described hame-tug fastener, composed of the hame-iron having one end curved outwardly and slotted and having the loop at its opposite end, and provided with a raised guideway having a series of openings and having its edges undercut to form projecting ledges, which have a portion removed at one end, the carrier having its edges bent to embrace said projecting ledges and having its end slotted and curved outwardly, and the latch-bolt mounted on the carrier and adapted to engage with one of the said openings in the guideway, substantially as described.

In testimony whereof I affix my signature in presence of two witnesses.

JOHN B. ALTMAN.

Witnesses:
PAUL BECKER,
F. SAUSER.